United States Patent [19]

Thorud

[11] Patent Number: 4,714,161
[45] Date of Patent: Dec. 22, 1987

[54] SECURITY CASSETTE HOLDER

[75] Inventor: Stanley R. Thorud, Brooklyn Center, Minn.

[73] Assignee: Liberty Diversified Industries, Minneapolis, Minn.

[21] Appl. No.: 794,088

[22] Filed: Nov. 1, 1985

Related U.S. Application Data

[63] Continuation-in-part of Ser. No. 771,342, Aug. 30, 1985, abandoned.

[51] Int. Cl.⁴ ..................... B65D 25/10; B65D 85/672
[52] U.S. Cl. ..................................... 206/387; 206/1.5; 206/807
[58] Field of Search ................. 206/1.5, 387, 807, 328, 206/334; 220/352

[56] References Cited

U.S. PATENT DOCUMENTS 3,828,922  8/1974  Holkestad ........................... 206/387
4,243,142  1/1981  Foreman ............................. 206/387
4,285,429  8/1981  Mactavish ........................... 206/1.5
4,572,369  2/1986  Morris ................................. 206/1.5

FOREIGN PATENT DOCUMENTS 0419263  3/1947  Italy ..................................... 220/352
2112753  7/1983  United Kingdom ............... 206/328

Primary Examiner—Jimmy G. Foster
Attorney, Agent, or Firm—Moore & Hansen

[57] ABSTRACT

A tamper-proof display holder for magnetic tape cassettes incorporates a cassette storage compartment having a cassette insertion opening in one end. After a cassette is inserted into the storage compartment, the opening is blocked against cassette removal by an elongated stop member forced through an aperture in one of the compartment walls so as to extend across the trailing side of the cassette with respect to the direction of cassette insertion. The stop member is firmly fixed in place in the aperture.

7 Claims, 6 Drawing Figures

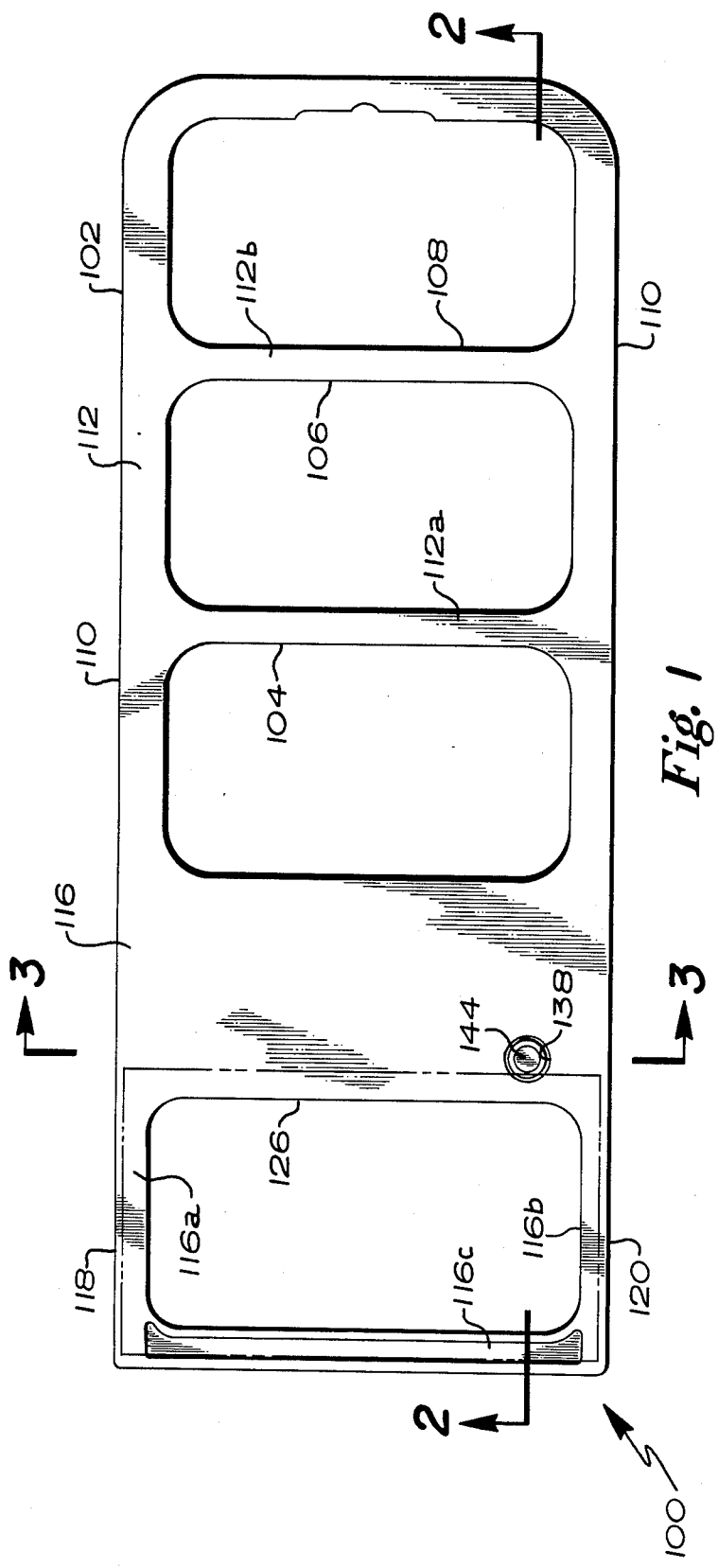
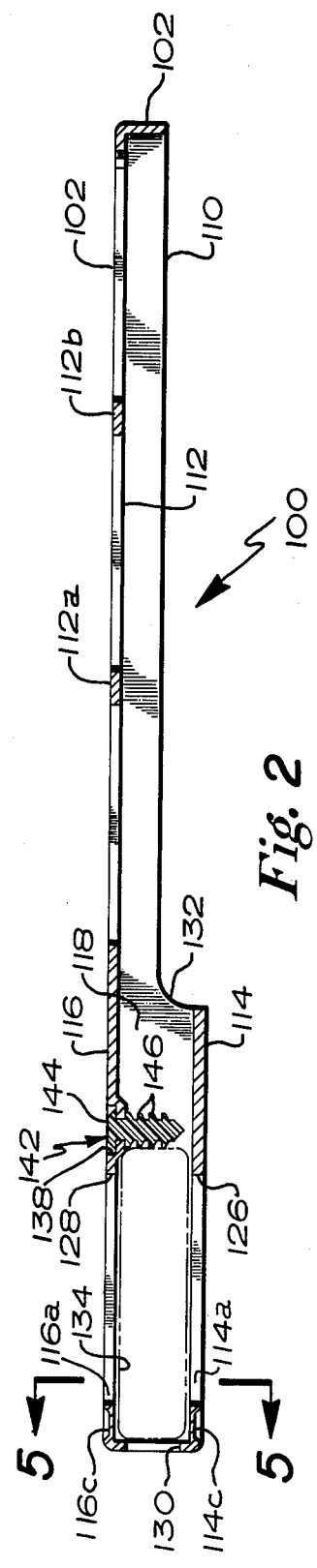

SECURITY CASSETTE HOLDER

BACKGROUND OF THE INVENTION

This application is a continuation-in-part of U.S. patent application Ser. No. 771,342, filed Aug. 30, 1985, now abandoned, and entitled TAMPER-PROOF DISPLAY HOLDER FOR TAPE CASSETTES.

This invention relates to packaging containers for audio tapes for retail display purposes, and particularly to such containers for tapes in cassette form.

Because such tapes as well as eight-track tapes are relatively small, they have been susceptible to increased pilfering in retail outlets. Attempts to deal with this problem have included enlarging the size of the package or container so as to make it more difficult for a person to conceal the item. One type of packaging container which has been developed to discourage theft is reusable. Such containers discourage, but do not eliminate, pilfering because they are intended to be opened by a sales clerk at the time of sale for reuse, and thus can be opened by persons not authorized to do so. Examples of such packaging devices are disclosed in U.S. Pat. Nos. 3,871,516 and 3,828,922. The reusable package disclosed in U.S. Pat. No. 3,828,922 is tailored to the size of the article to be packaged. U.S. Pat. Nos. 3,587,837 and 3,776,374 also disclose oversize containers to discourage the theft of magnetic tape cartridges, the latter patent disclosing a container which has a display window to display a packaged cartridge in combination with a thin layer of thermoplastic wrapper which is heat shrunk around the entire container.

U.S. Pat. No. 4,381,836, which shares common ownership with the packaging device disclosed and claimed herein, is directed to an antitheft point-of-sale container for magnetic audio tapes, with the container having a hinged cover permanently held in place for theft prevention purposes by barbed tabs. The container is formed of polypropylene plastic, and since the cover cannot be opened once it is closed, the container must be destroyed in order for the user to obtain access to the tapes contained therein. Such a container has proven effective to avoid theft of magnetic tapes. However, the hinged cover makes it relatively expensive and somewhat cumbersome in the course of packaging tapes within the container.

U.S. Pat. Nos. 4,445,612, Re. 30,184 and 3,994,551 disclose holders for tape cassettes. The holders disclosed in those patents are intended to permanently house the cassette for use by the owner with the cassette being removed for playing. The latter patent discloses a latch, displaceable by finger pressure, for holding cassettes within a container. U.S. Pat. No. 4,445,612, among the aforesaid patents, is also not an anti-theft security container. Locking lugs used to hold a cassette cartridge within the container can be released by squeezing inwardly on the side walls of the container. Likewise, U.S. Pat. No. Re. 30,184 discloses a container box to protect cassette cartridges when they are not being used. The user may open the container to obtain access to the cartridge when desired by manually releasing blocking means holding the cassette within the container. That patent does disclose locking tongues which act like leaf springs and which are formed from the covering wall of the container to engage within the core apertures of a cassette tape spool to hold the cassette cartridge within the container.

All of the aforesaid prior art packaging devices suffer from disadvantages for security purposes, as well as with respect to ease of manufacturing and assembly, as stated above. The display holder disclosed herein overcome the previously encountered problems in a particularly effective way to provide a tamper-proof, point-of-purchase display container for audio tapes.

BRIEF SUMMARY OF THE INVENTION

The display holder for magnetic tapes disclosed herein provides a tamper-proof storage compartment for a magnetic tape spool in such a way as to greatly simplify manufacturing and assembly procedures for the insertion of the tape cartridge within the storage compartment, while minimizing manufacturing costs.

The tamper-proof cassette holder disclosed herein is particularly characterized by a stop member fixed in place through an aperture in one of the wall segments defining a tape cassette storage compartment. The stop member has an elongated body which projects behind and across the trailing side of a tape cassette with respect to its direction of insertion into the compartment through an opening in one end thereof. The stop member aperture is located adjacent to the aforesaid compartment opening and is spaced a predetermined distance from a second wall segment opposite the compartment opening so that a cassette having a dimension in the direction of insertion substantially equal to said predetermined distance will be confined between said stop member and said second wall segment.

Advantageously, the aforesaid stop member aperture is located in the top or bottom wall of the storage compartment at an off center location therein with respect to the length dimension of the trailing side of the cassette extending perpendicular to the direction of cassette insertion through said opening. The stop member is thus positioned adjacent to one end of the cassette and to one end of the top or bottom wall of the storage compartment. This stop member location ensures that it cannot be displaced a sufficient distance by flexing the top or bottom wall of the holder compartment so as to slide the cassette out past the stop member.

Preferably the aforesaid stop member comprises a push fastener which is pressed through the aperture in the compartment wall after the cassette is inserted into the storage compartment.

These and other objects and advantages of the invention will become readily apparent as the following description is read in conjunction with the accompanying drawings wherein like reference numerals are used to refer to like elements in the various views.

BRIEF DESCRIPTION OF THE DRAWINGS

FIG. 1 is a bottom, plan view of the cassette holder of this invention;

FIG. 2 is a vertical section view of the cassette holder taken along lines 2—2 of FIG. 1;

DESCRIPTION OF THE PREFERRED EMBODIMENT

Figure 3:
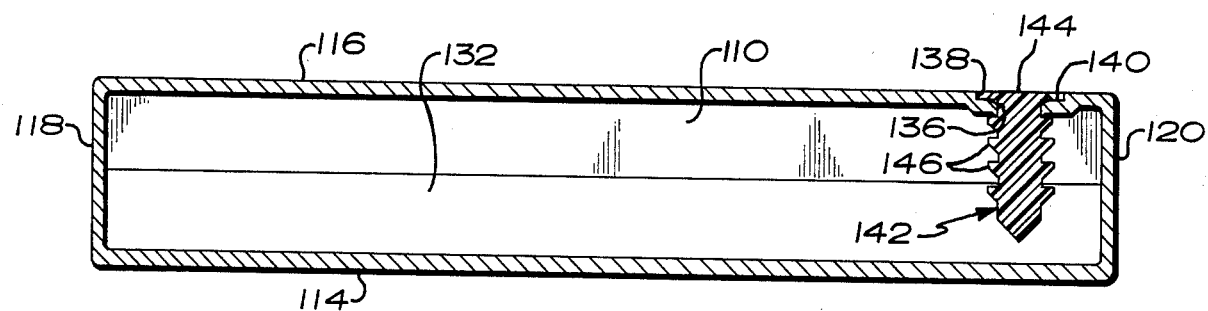
FIG. 3 is a transverse section view taken along lines 3—3 of FIG. 1.
Figure 6:
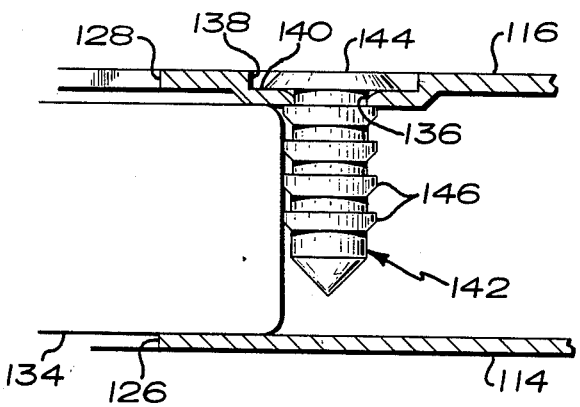
FIG. 6 is a fragmentary, vertical section view on an enlarged scale and showing the stop member in place at the location shown in FIG. 2.

With reference to the drawings, the holder device is indicated generally by reference numeral 100. It is provided with an elongated handle 102 apertured as shown at 104, 106, and 108 to save material and to provide a gripping handle as desired at one end of the device. The gripping handle as defined by aperture 108 may also be used to hang the holder from a display bracket, if desired. The elongated handle 102 is comprised of a base wall 112 and an upstanding, continuous side wall 110. Bridging base wall segments 112a and 112b define apertures 104, 106, and 108 in cooperation with base wall 112.

Figure 5:
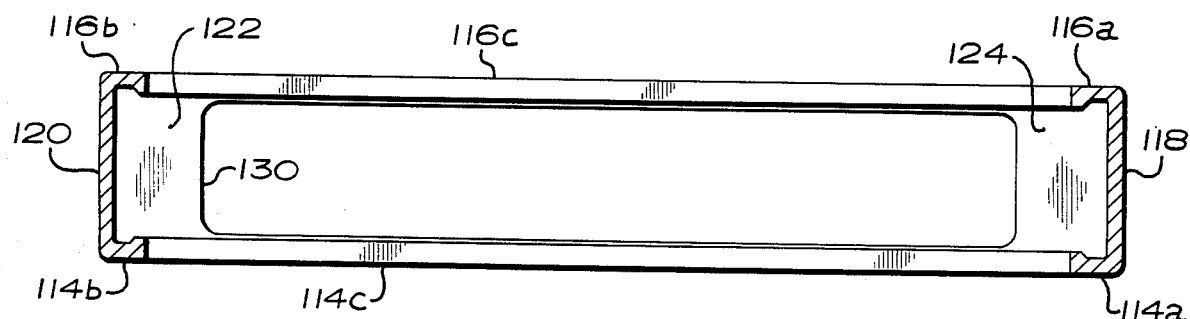
FIG. 5 is a vertical section view of the holder showing the end wall of the storage compartment and taken along lines 5—5 of FIG. 2.

At the left end of the holder as viewed in FIGS. 1 and 2, the device is provided with a storage compartment for housing a magnetic tape, preferably a tape cassette. For that purpose, the holder device is provided with top and bottom walls 114 and 116 cooperating with side walls 118 and 120 and end wall segments 122 and 124 to define a storage compartment for a cassette as shown in FIGS. 1, 2, and 5. Top wall 114 is apertured as shown at 126, with bottom wall 116 having an aligned aperture 128 of the same size. End wall aperture 130 is provided on the cassette storage compartment to view a label on the cassette. The compartment top wall 114 includes elongated wall segments 114a and 114b cooperating with an inwardly recessed wall segment 114c adjacent the end of the cassette compartment to define aperture 126. The bottom of the cassette holding compartment is formed essentially in the same manner as the top side. Bottom wall segments 116a, 116b, and 116c as shown in FIGS. 2 and 5 are coextensive with corresponding top wall segments 114a, 114b, and 114c.

The cassette storage compartment is open along its end opposite end wall segments 112 and 124, between top and bottom walls 114 and 116, and adjacent to elongated handle 102 in order to provide a cassette insertion opening 132 as indicated in FIGS. 1 and 3. A tape cassette 134 is shown in phantom line in position within the storage compartment in FIG. 1.

As a restraint means for securely preventing the removal of a tape cassette from the storage compartment, an aperture 136 is provided in cross web bottom wall 116 of the storage compartment to receive a stop member 142. Compartment bottom wall 116 is recessed downwardly along side walls 138 to define a seat 140. Stop member 142 has a head 144 at its upper end which rests on seat 140 within recess 138. Stop member 142 has an elongated body as shown in FIG. 1 which projects towards opposite, top wall 114 of the cassette storage compartment. Although stop members of various shapes and structures may be utilized, the form shown having a plurality of longitudinally spaced rings defining peripheral barbs 146 has proven to be particularly effective.

Preferably, the entire cassette holder is molded from plastic material. Polypropylene has been found to be particularly suitable. The plastic walls of the cassette holder do have a measure of flexibility. That factor has led to several of the security features embodied in the restraint means for holding a cassette 134 within the storage compartment. One of those features is the location of stop member aperture 136. Aperture 136 is located as shown in FIGS. 1 and 2 at an offset location from the center of compartment bottom wall of 116. Thus, aperture 136 is at an off center location with respect to the length of the trailing side of the cassette 134 so as to be positioned adjacent to one end of the cassette and thus adjacent to one end of cross web or bottom wall 116. The dimension of extent of the bottom wall 116 and of cassette 134 with respect to which aperture 136 has an off center location is the dimension which would extend substantially at right angles to the direction of insertion of the cassette through opening 132. Such an offset location for aperture 136, and thus for stop member 142, ensures that stop member 142 will be at a location adjacent one end of bottom wall 116 near side wall 110 of the holder where wall 116 could be flexed outwardly away from opposite wall 114 only a minimal distance. The greatest flexural displacement for wall 116 could be obtained at its center with respect to its aforesaid dimension extending transversely of the cassette holder as viewed in FIG. 1. It is possible that a thief could force wall 116 outwardly far enough at its center to raise stop member 142 to the point where tape cassette 134 could be slid past it back out through access opening 132.

The same security considerations led to the selection of the length of the elongated body portion of stop member 142. As is shown in FIG. 2, the inner or bottom end of stop member 142 terminates short of, and is spaced from, top wall 114 of the cassette storage compartment. By virtue of this structural arrangement, top wall 114 cannot be flexed inwardly by external pressure so as to engage stop member 142 and displace it outwardly through aperture 136.

In the assembly procedure by the supplier of tape cassettes, a cassette 134 would be inserted through opening 132 into the storage compartment. After the cassette is in place, stop member 142 is pushed into place through bottom wall aperture 136 to the position shown in FIG. 2. Aperture 136 is so located that the elongated body portion of stop member 142 will be positioned a predetermined distance from end wall segments 122 and 124 of the storage compartment substantially corresponding to the width of a cassette 134. Thus, the cassette will be securely held in place between the elongated body of stop member 142 and the opposed end walls 122, 124 of the storage compartment. As shown in FIG. 2, barbs 146 of stop member 142 will abut against the rear or trailing side of cassette 134 to hold it in place. If the cassette were loosely positioned between stop member 142 and the opposite walls of the storage compartment, it is possible that it could be manipulated around stop member 142 and removed through compartment opening 132. In the embodiment shown in FIGS. 1 and 2, the stop member 142 takes the form of a push fastener which is forced through aperture 136 in a force fit engagement therewith. The head 144 of stop member 142 is separated from the top ring or barb 146 so as to define a neck which is in a friction fit with the inside diameter of aperture 136. As stop member 142 is forced into place through aperture 136, the bottom barbs or rings 146 displace the plastic material around aperture 136 downwardly. The plastic material, e.g., polypropylene, has enough memory that it returns back upwardly. However, since the memory is not perfect, the plastic material around aperture 36 will remain displaced somewhat downwardly.

The side walls of recess 138 around aperture 136 are of a predetermined height which will permit the top surface of head 144 of stop member 142 to be flush with the top, outer surface of compartment wall 116. In this way a group of loaded cassettes can be stacked evenly on top of each other for storage purposes, if desired. Also, the height of side walls 138 formed in the recess for head 144 is such that head 144 will be totally enclosed therein. This prevents a prospective thief from slipping a knife or other instrument under head 144 in an effort to displace stop member 142 outwardly from aperture 136.

Figure 4:
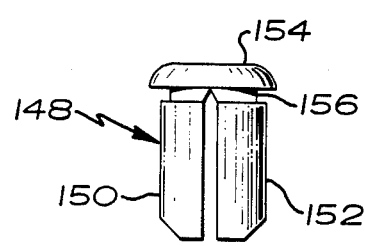
FIG. 4 is an elevation view of an alternative form of stop member.

Various forms of stop members may be utilized for the restraint device to hold a cassette in place within the holder compartment. FIG. 4 illustrates another version of a push fastener type of stop member. The push fastener 148 shown in FIG. 4 has a pair of split legs 150, 152 which can be pushed together as the fastener is inserted through aperture 136. After the legs pass through aperture 136 in wall 116, they spring back apart. Fastener 148 has a top head 154 separated from the upper ends of legs 150, 152 so as to form a reduced diameter neck 156 therebetween. When inserted through aperture 136 in wall 116 of the holder compartment, neck 156 will be securely retained in a friction fit with aperture 136; and, head 154 will rest flush upon recess seat 140 so that its top surface is flush with the top face of compartment wall 116.

It is also anticipated that two stop members may be utilized instead of one. With such an arrangement, a second stop member would be inserted through a second aperture at the opposite side of compartment wall 116 from that at which aperture 136 is located. The second aperture for the second stop member would thus be disposed adjacent to side wall 118 of the storage compartment.

It is anticipated that various other changes may be made in the construction, shape, and size of the cassette holder device shown and described herein without departing from the spirit and scope of the invention as defined by the following claims.

What is claimed is:

1. A tamper-proof display holder for a magnetic tape cassette comprising:
    an elongated holder having a tape cassette storage compartment defined by top, bottom, side, and end wall segments;
    an opening in one end of said compartment through which a tape cassette may be inserted into said compartment; and
    restraint means for securely preventing the removal of said tape cassette from said storage compartment comprising an aperture through one of said wall segments adjacent to said opening, and a stop member having an elongated body extending through said aperture and projecting across the trailing side of a tape cassette with respect to its direction of insertion through said opening with said elongated body being located in blocking position with respect to said tape cassette trailing side a predetermined distance from a second wall segment of said compartment opposite said compartment opening to confine a tape cassette between said elongated body and said second wall segment, said stop member comprising a push fastener having a head extending transversely of said elongated body separated along the length of said elongated body from a shoulder extending transversely of said body, by a recessed neck tightly held in said aperture in forced-fit engagement therewith, with a portion of said one wall segment defining said aperture securely, directly engaged between said head and said shoulder, whereby said fastener cannot be removed.

2. A cassette holder as defined in claim 1 wherein:
    said one wall segment of said compartment has a recess therein within which said fastener head is seated.

3. A tamper-proof display holder for a magnetic tape cassette comprising:
    an elongated holder having a tape cassette storage compartment defined by top, bottom, side, and end wall segments;
    an opening in one end of said compartment through which a tape cassette may be inserted into said compartment; and
    restraint means for securely preventing the removal of said tape cassette from said storage compartment comprising an aperture through one of said wall segments adjacent to said opening, and a stop member having an elongated body extending through said aperture and projecting across the trailing side of a tape cassette with respect to its direction of insertion through said opening with said elongated body being located in blocking position with respect to said tape cassette trailing side a predetermined distance from a second wall segment of said compartment opposite said compartment opening to confine a tape cassette between said elongated body and said second wall segment, said elongated body of said stop member terminating short of and in spaced-apart relation to a third wall segment of such storage compartment opposite said one wall segment having said aperture therein, whereby said third wall segment may not be pushed inwardly to contact said stop member in an effort to displace it.

4. A cassette holder as defined in claim 3 wherein:
    said aperture is in one of the opposing top or bottom walls of said compartment at an off center location therein with respect to the length of said trailing side of said cassette so as to be positioned adjacent to one end of said cassette trailing side.

5. A cassette holder as defined in claim 4 wherein:
    said aperture is formed in the bottom wall of said compartment.

6. A cassette holder as defined in claim 3 wherein:
    said stop member has a head on its upper end; and
    a recess is formed within said one wall segment of said storage compartment around said aperture, said recess having side walls in closely spaced relation to said head preventing access to the underside of said head by a tool for attempted removal of said stop member.

7. A tamper-proof display holder for a magnetic tape cassette comprising:
    an elongated holder having a tape cassette storage compartment defined by top, bottom, side, and end wall segments;
    an opening in one end of said compartment through which a tape cassette may be inserted into said compartment; and
    restraint means for securely preventing the removal of said tape cassette from said storage compartment comprising an aperture through one of said wall segments adjacent to said opening, and a stop member having an elongated body extending through said aperture and projecting across the trailing side of a tape cassette with respect to its direction of insertion through said opening with said elongated body being located in blocking position with respect to said tape cassette trailing side a predetermined distance from a second wall segment of said compartment opposite said compartment opening to confine a tape cassette between said elongated body and said second wall segment, said stop member having a head on its upper end; and a recess formed within said one wall segment of said storage compartment, with said head being seated in said recess flush with the upper surface of said one wall segment.

* * * * *